United States Patent [19]

Gute

[11] Patent Number: 5,338,083
[45] Date of Patent: Aug. 16, 1994

[54] VISOR DETENT SPRING CLIP

[75] Inventor: Robert M. Gute, Corunna, Mich.

[73] Assignee: Plasta Fiber Industries Corp., Marlette, Mich.

[21] Appl. No.: 9,548

[22] Filed: Jan. 26, 1993

[51] Int. Cl.⁵ .............................................. B60J 3/02
[52] U.S. Cl. ................................. 296/97.9; 296/97.12
[58] Field of Search ................... 296/97.9, 97.12, 97.13

[56] References Cited

U.S. PATENT DOCUMENTS

| | | | |
|---|---|---|---|
| 4,070,054 | 1/1978 | Cziptschirsch | 296/97 |
| 4,469,367 | 9/1984 | Kuttler et al. | 296/97 |
| 4,617,699 | 10/1986 | Nakamura | 16/262 |
| 4,702,513 | 10/1987 | Ebert et al. | 296/97.9 |
| 4,785,500 | 11/1988 | Langridge | 16/297 |
| 5,071,186 | 12/1991 | Hemeke et al. | 296/97.9 |
| 5,080,420 | 1/1992 | Hemmeke et al. | 296/97.1 |
| 5,139,303 | 8/1992 | Miller | 296/97.9 |
| 5,251,949 | 10/1993 | Miller et al. | 296/97.12 |

FOREIGN PATENT DOCUMENTS 399187 11/1990 European Pat. Off. .......... 296/97.12

*Primary Examiner*—Joseph D. Pape
*Attorney, Agent, or Firm*—Brooks & Kushman

[57] ABSTRACT

An arrangement for attaching a visor to a vehicle in storage and use positions. The attachment arrangement is formed from a pivot shaft having a mounted end adapted to be mounted to the vehicle and a free end. The pivot shaft has a flat surface which is oriented along the longitudinal axis of the pivot shaft a predetermined distance between the mounting end and the free end. The pivot shaft further has a circumambient groove located around the pivot shaft. A spring clip is also provided which cooperates between the visor and the pivot shaft to pivotally position the visor. The spring clip has a narrow portion which cooperates with the flat surface on the pivot shaft to provide a detent for positioning the visor in a storage position. The spring clip has a wide portion which spans the predetermined distance and is located opposite the narrow portion to ensure free pivotal movement of the visor about the pivot shaft except in the storage position. The spring clip further has a locating follower on the wide portion cooperating with the groove for longitudinally locating the spring clip on the pivot shaft.

9 Claims, 2 Drawing Sheets

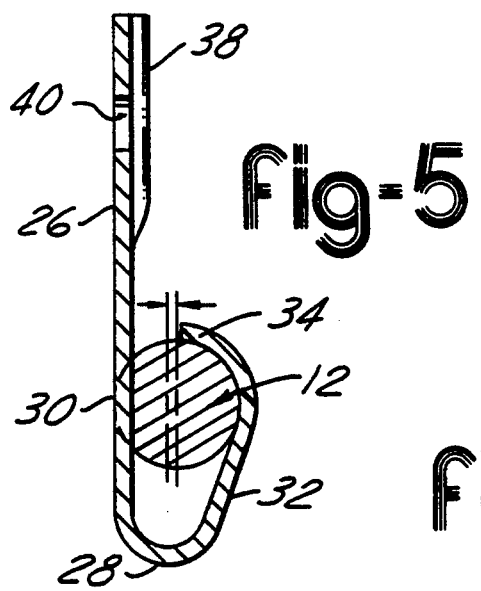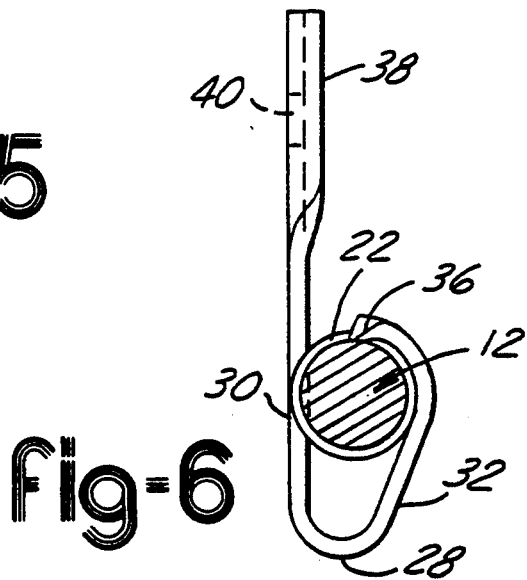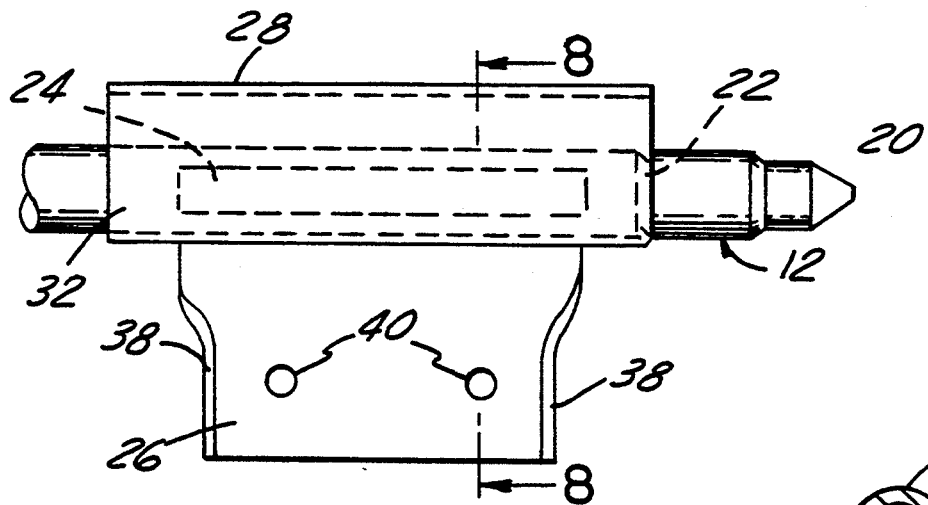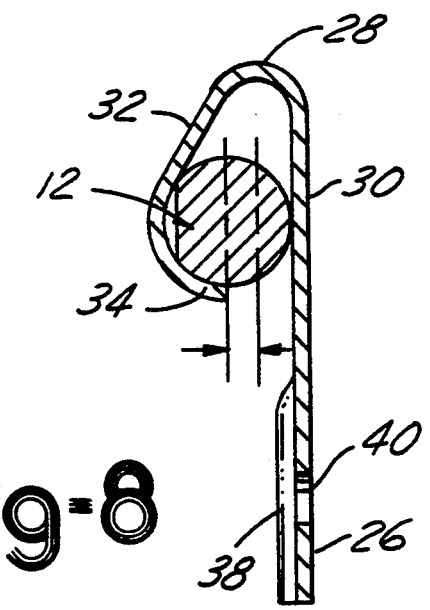

VISOR DETENT SPRING CLIP

TECHNICAL FIELD

This invention relates to vehicle visors and in particular to an attachment arrangement for securing a visor to a vehicle.

BACKGROUND OF THE INVENTION

Conventional pivot shafts are generally circular having one flat side to provide a detent position for the attachment mechanism. The flat side of the pivot shaft cooperates with the attachment mechanism to enable the visor to securely remain in the stored position. The present invention incorporates this use of the pivot shaft having a detent position.

Traditionally, visor spring clips have used various alternatives to provide free rotation of the visor about the pivot shaft except in the storage position.

For example, U.S. Pat. Nos. 5,071,186 and 5,080,420 to Hemmeke et al. disclose a pair of visor mounting brackets which include C-shaped spring clips having a flat end segment cooperating with the flat surface of the pivot arm. Hemmeke et al. utilize the C-shaped clip in combination with a mounting boss to attach the visor to the pivot arm.

An alternative approach is shown in U.S. Pat. No. 4,469,367 to Kuttler et al. which utilizes a spring clip which is wrapped around the pivot arm for mounting the visor. The U-shaped spring clip includes a web which is wrapped around the pivot arm and has arms which extend from the web. The ends of the arms include an inwardly facing hook and a hooking edge that are hooked together in tension during mounting of a visor.

U.S. Pat. No. 4,070,054 to Cziptschirsch utilizes a similar approach. Cziptschirsch discloses a U-shaped flat spring clip which wraps around the pivot arm for mounting a visor. The spring clip has a pair of legs, one having a hookable part which cooperates with a hookable element on the opposed opposite leg to place the spring clip under tension as the visor is secured about the pivot arm. The pivot arm shown in the Cziptschirsch patent contains two flat surfaces.

U.S. Pat. No. 4,617,699 to Nakamura discloses an alternative approach which utilizes a hinge structure for a sun visor featuring a single storage position snap action function. The spring clip discloses a pair of offset opposing flat surfaces which cooperate with similarly arranged flat surfaces on the pivot arm. A first spring clip contains lanced tangs which cooperate with a second clip having apertures to securely receive the pivot arm within the sun visor housing.

U.S. Pat. No. 5,139,303 assigned to applicant's assignee discloses a mechanism and method for attaching a visor to a pivot shaft by providing a generally U-shaped clip having first and second arms within a cooperating clip housing integrally formed within the rear panel of the visor. A conduit is formed by the spring clip enabling the sliding of the pivot shaft along both the clip housing and the spring clip. The clip housing is designed to cooperate with the pivot shaft to pre-stress the spring clip thereby eliminating excess play between the spring clip and the visor when the visor is pivoted. The attachment mechanism is designed such that a snap-shut hook is received within a receiving hook, thereby effectively securing the visor to the pivot shaft.

A further approach is disclosed in U.S. Pat. No. 4,785,500 to Langridge which utilizes a hinge assembly having a pair of sleeve legs interconnected by a base portion, The legs are pre-loaded to resiliently and frictionally engage the sides of the pivot arm to retain the visor in a preselected rotation position relative to the pivot arm. The spring clip also includes a lateral support portion generally adjacent each longitudinal end of one leg of the spring clip. The lateral support portions are each generally U-shaped in lateral cross section and have a pair of spaced support legs protruding laterally toward and around the pivot arm. The support legs engage the outer surface of the pivot arm to laterally support and substantially maintain the spring clip in lateral alignment. The support legs also bias the pivot arm in a direction generally away from one leg of the spring clip toward the other leg to bias the spring clip toward the detent function when the visor is rotated to the storage position.

The present invention incorporates all of the known benefits of spring clips for visors providing only one detent and preventing lateral movement of the visor along the pivot shaft while improving the overall attachment mechanism.

SUMMARY OF THE INVENTION

The present invention is an arrangement for attaching a visor to a vehicle in storage and use positions. The attachment arrangement is formed for a pivot shaft which is provided and has a mounting end adapted to be mounted to the vehicle and also has a free end. The pivot shaft has a flat surface which is oriented along the longitudinal axis of the pivot shaft a predetermined distance between the mounting end and the free end. A spring clip is also provided which cooperates between the visor and the pivot shaft to pivotally position the visor. The spring clip has a narrow portion which cooperates with the flat surface of the pivot shaft to provide a detent for positioning the visor in a storage position. The spring clip has a wide portion which spans the predetermined flat length and is located opposite the narrow portion so as to insure free pivotal movement of the visor about the pivot shaft except in the storage position.

Accordingly, an object of the present invention is to provide a relatively inexpensive attachment mechanism for securing a visor to the pivot shaft to allow free pivotal movement of the visor about the pivot shaft except in the storage position while longitudinally locating the spring clip on the pivot shaft.

Another object of the present invention is to provide an improved attachment arrangement for securely attaching a visor to a pivot shaft while enabling free pivotal movement of the visor except in the storage position and longitudinally locating the spring clip on the pivot shaft.

BRIEF DESCRIPTION OF THE DRAWINGS

FIG. 5 is a sectional view of the spring clip arrangement taken along line 5—5 of FIG. 2 showing the spring clip in the storage position;

FIG. 6 is a sectional view similar to that shown in FIG. 5 taken along line 6—6 in FIG. 2 showing the locating means cooperating with the groove in the pivot shaft;

FIG. 7 is a front elevational view of the spring clip shown in a non-storage position showing the flat surface in phantom being spanned by the wide portion of the spring clip in accordance with the present invention; and FIG. 8 is a sectional view of the spring clip taken along line 8—8 of FIG. 7.

DETAILED DESCRIPTION OF THE PREFERRED EMBODIMENT

FIGS. 1 through 8 illustrate an improved visor attachment arrangement indicated generally at 10. The arrangement 10, is formed from two major components, a pivot shaft, generally indicated at 12 and a spring clip, generally indicated at 14. The pivot shaft 12 and the spring clip 14 cooperate to pivotally secure a visor 16 to a vehicle in a plurality of positions.

Figure 1:
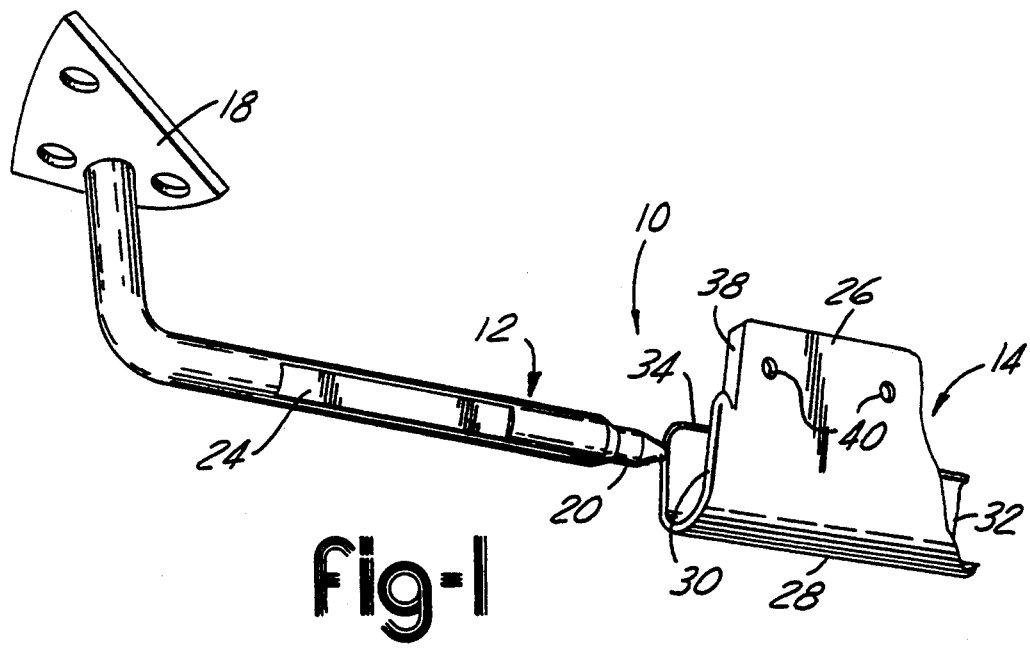
FIG. 1 is an exploded view in perspective of the attachment arrangement in accordance with the present invention, partially broken away, showing the locating means in accordance with the present invention.
Figure 2:
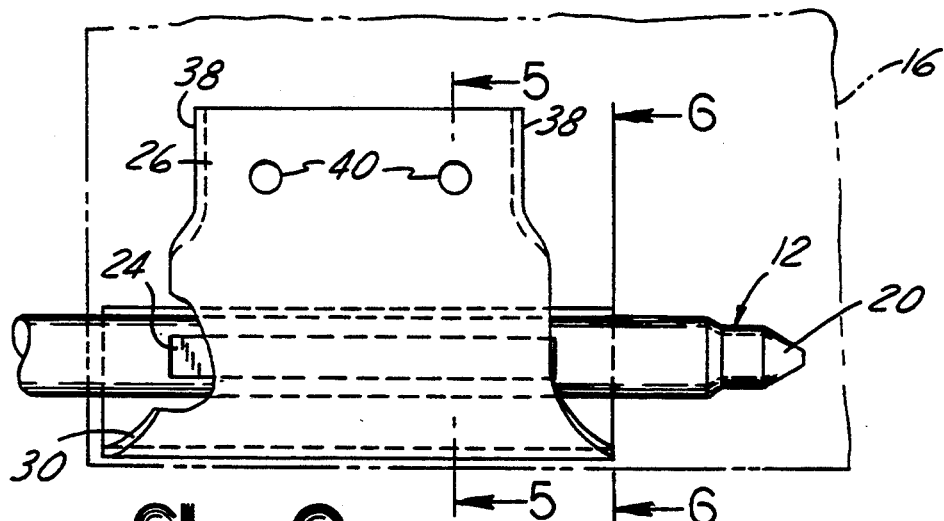
FIG. 2 is a rear elevational view, partially cut away, showing the visor in phantom in the storage position with the narrow portion of the spring clip seated on the flat surface of the pivot shaft.
Figure 3:
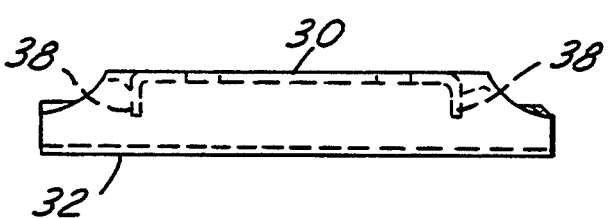
FIG. 3 is a bottom elevational view of the spring clip in accordance with the present invention.
Figure 4:
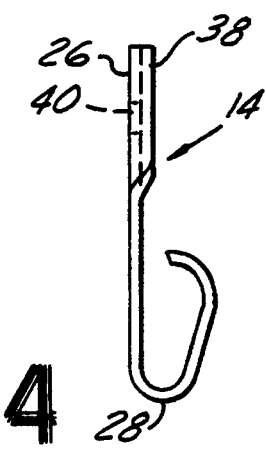
FIG. 4 is a side elevational view of the spring clip in accordance with the present invention.

As best shown in FIGS. 1, 2 and 7, the pivot shaft 12 has a mounting end 18 which is mounted to the interior of the vehicle. The pivot shaft also has a free end 20, which in this embodiment is tapered to assist in fitting the spring clip 14 onto the pivot shaft 12. Adjacent the pivot shaft free end 20 is a circumambient groove 22. The groove 22 is oriented generally perpendicular to the longitudinal axis of the pivot shaft 12. The pivot shaft also has a flat surface 24 which covers a predetermined distance between the mounting end 18 and the free end 20. The flat surface 24 is generally oriented along the longitudinal axis of the pivot shaft 12. The flat surface 24 cooperates with the spring clip 14 to provide a detent when the visor 16 is in a storage position (shown in phantom in FIG. 2) adjacent the headliner of the vehicle.

The spring clip 14 as shown in FIGS. 1-8 has a generally straight body 26 and a curved head 28. The head 28 has a narrow portion 30 adjacent the body 26. The narrow portion 30 is sized to fit on and within the flat surface 24 of the pivot shaft 12 when restraining the visor in a storage position. A wide portion 32 is located opposite the narrow portion 30 on the head 28. The wide portion 32 is sufficiently wide so as to span the predetermined distance of the flat surface 24 when the visor is rotated from the storage position (as shown in FIG. 7).

A free end 34 of the head 28 is curled or curved toward the narrow portion 30. The internal radius of the curved free end 34 is adapted to interface approximately 90° of the curved surface of the pivot shaft 12 (best shown in FIGS. 5, 6 and 8) where the free end curls around the pivot shaft to locate the pivot shaft 12 within the curl of the spring clip 14. The head 28 interfaces the pivot shaft 12 as seen in FIGS. 5, 6 and 8 to prevent the pivot shaft from moving vertically with respect to the curved free end 34 ensuring smooth movement of the visor 16 as it moves between the storage position and the use position.

The body 26 has a pair of opposed flanges 38 oriented generally perpendicular to the body 26 to provide additional stability and strength to the spring clip 14. Located between the flanges 38 is a pair of holes 40 which are provided for anchoring the spring clip to the visor 16 by conventional fasteners (not shown).

In operation, the spring clip 14 is anchored to the visor 16 and fitted over the tapered free end 20 of the pivot shaft 12. The spring clip 14 is forced onto the pivot shaft 12 until the follower 36 snaps into or is seated within the groove 22. The visor 16 can then freely pivot about the pivot shaft 12 except when in the storage position where a detent is provided by cooperation of the narrow portion 30 seating on the flat surface 24. The follower 36 tracks within the groove 22 throughout all pivotal movement of the visor 16 to longitudinally locate the visor 16 on the pivot shaft 12.

While the best modes for carrying out the invention have been described in detail, those familiar with the art to which this invention relates will recognize various alternative designs and embodiments for practicing this invention as defined by the following claims.

What is claimed is:

1. An arrangement for attaching a visor to a vehicle in storage and use positions, the arrangment comprising:

a pivot shaft having a mounting end adapted to be mounted to the vehicle and having a free end, the pivot shaft having a curved surface with a flat portion oriented along a longitudinal axis of the pivot shaft for a predetermined distance between the mounting end and the free end of the pivot shaft; and a spring clip on said pivot shaft adapted for enabling cooperation between the visor and the pivot shaft for pivotally positioning the visor in the storage and use positions, the spring clip having a narrow portion cooperating with the flat portion of the pivot shaft to provide a detent adapted for positioning the visor in a storage position, the spring clip having a wide portion located opposite the narrow portion and spanning the flat surface for the predetermined distance whereby the ensure free pivotal movement of the spring clip about the pivot shaft for positioning the visor in the use positions except when the narrow portion of the clip is cooperating with the flat surface to provide a detent at the storage position, and the wide portion having a curved free end interfacing approximately 90 degrees of the curved surface of the pivot shaft ensuring proper vertical alignment of the pivot shaft within the spring clip.

2. The arrangement of claim 1 wherein the pivot shaft includes a circumambient groove around the pivot shaft.

3. The arrangement of claim 2 wherein the spring clip includes locating means on the wide portion cooperating with the groove for longitudinally locating the spring clip on the pivot shaft.

4. An arrangement for attaching a visor to a vehicle for movement between a plurality of positions, the arrangment comprising:

a pivot shaft having a mounting end and a free end, the pivot shaft having a curved surface with a flat portion oriented along the longitudinal axis of the pivot shaft a predetermined distance between the mounting end and the free end; and a spring clip having anchoring means for anchoring the spring clip to the visor, the spring clip having locating means for aligning the spring clip on the pivot shaft, the spring clip having a narrow portion cooperating with the flat portion on the pivot shaft to provide a detent for restraining the visor in one of said plurality of storage positions and a wide portion located opposite the narrow portion and spanning the predetermined distance enabling the spring clip to ride over the flat portion of the pivot shaft when the visor is not being restrained in said one position, and the wide portion having a curved free end interfacing approximately 90 degrees of the curved surface of the pivot shaft ensuring proper vertical alignment of the pivot shaft within the spring clip when the visor is moving between the plurality of positions.

5. An arrangement for attaching a visor to a vehicle in storage and use positions, the arrangment comprising:

a pivot shaft having a mounting end adapted to be mounted to the vehicle and having a free end, the pivot shaft having a flat surface oriented along a longitudinal axis of the pivot shaft for a predetermined distance between the mounting end and the free end of the pivot shaft, the pivot shaft having a circumambient groove around the pivot shaft; and a spring clip on said pivot shaft adapted for enabling cooperation between the visor and the pivot shaft for pivotally positioning the visor in the storage and use positions, the spring clip having a narrow portion cooperating with the flat surface of the pivot shaft to provide a detent adapted for positioning the visor in a storage position, the spring clip having a wide portion located opposite the narrow portion and spanning the flat surface for the predetermined distance whereby to ensure free pivotal movement of the spring clip about the pivot shaft for positioning the visor in the use positions except when the narrow portion of the clip is cooperating with the flat surface to provide a detent at the storage position, and the spring clip having locating means on the wide portion cooperating with the groove for longitudinally locating the spring clip on the pivot shaft;

wherein the spring clip includes anchoring means for anchoring the spring clip to the visor, opposed flange portions for increased stability and strength, and wherein the anchoring means includes a base portion defining an aperture adapted to receive a fastener for anchoring the spring clip to the visor.

6. The arrangement of claim 1 in combination with the visor wherein the spring clip includes anchoring means for anchoring the spring clip to the visor.

7. The arrangement of claim 6 wherein the anchoring means includes a base portion defining an aperture adapted to receive a fastener for anchoring the spring clip to the visor.

8. The arrangement of claim 6 wherein the anchoring means further includes opposed flange portions for increased stability and strength.

9. The arrangement of claim 4 wherein the pivot shaft has a circumambient groove in the curved surface and the locating means includes a bend in the wide portion of the spring clip adapted to travel within the groove to longitudinally locate the spring clip on the pivot shaft.

* * * * *

UNITED STATES PATENT AND TRADEMARK OFFICE
CERTIFICATE OF CORRECTION

PATENT NO. : 5,338,083
DATED : August 16, 1994
INVENTOR(S) : Robert M. Gute

It is certified that error appears in the above-indentified patent and that said Letters Patent is hereby corrected as shown below:

Column 1, line 65, after "pivoted", replace "," with "."--;
Column 2, line 4, after "portion", replace "," with "."--.

Signed and Sealed this

Seventh Day of March, 1995

Attest:

BRUCE LEHMAN

*Attesting Officer*  *Commissioner of Patents and Trademarks*